(12) United States Patent
Chen et al.

(10) Patent No.: US 9,304,548 B2
(45) Date of Patent: Apr. 5, 2016

(54) DOCKING STATION OF ELECTRONIC DEVICE

(71) Applicant: Wistron Corporation, New Taipei (TW)

(72) Inventors: Hung-Sheng Chen, New Taipei (TW); Wen-Long Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 43 days.

(21) Appl. No.: 14/312,705

(22) Filed: Jun. 24, 2014

(65) Prior Publication Data
US 2015/0268695 A1    Sep. 24, 2015

(30) Foreign Application Priority Data

Mar. 24, 2014    (TW) .............................. 103110874 A

(51) Int. Cl.
| | |
|---|---|
| *G06F 1/16* | (2006.01) |
| *H05K 5/00* | (2006.01) |
| *H05K 7/00* | (2006.01) |
| *H01R 13/44* | (2006.01) |
| *H01R 13/631* | (2006.01) |
| *H01R 13/64* | (2006.01) |

(52) U.S. Cl.
CPC .............. *G06F 1/1632* (2013.01); *H01R 13/44* (2013.01); *H01R 13/631* (2013.01); *H01R 13/64* (2013.01); *H01R 2201/06* (2013.01)

(58) Field of Classification Search
CPC ...................................................... G06F 1/1632
USPC .............. 361/679.41, 679.42, 679.43, 679.44
See application file for complete search history.

(56) References Cited

U.S. PATENT DOCUMENTS

| | | | | |
|---|---|---|---|---|
| 6,275,378 | B1 * | 8/2001 | Lee ..................... | E05B 73/0082 248/553 |
| 6,912,125 | B2 * | 6/2005 | Weng .................... | G06F 1/1632 361/679.41 |
| 7,381,079 | B2 * | 6/2008 | Chuang ................. | G06F 1/1632 361/679.41 |
| 7,633,750 | B2 * | 12/2009 | Fan ....................... | G06F 1/1632 361/679.41 |
| 8,467,182 | B2 * | 6/2013 | Chen .................... | G06F 1/1632 361/679.41 |
| 2012/0224321 | A1 * | 9/2012 | Carnevali .............. | G06F 1/1632 361/679.43 |

* cited by examiner

*Primary Examiner* — Anthony Haughton
(74) *Attorney, Agent, or Firm* — Jianq Chyun IP Office

(57) ABSTRACT

A docking station of an electronic device includes a casing having a bearing surface, a fool-proofing set, an elastic member, a connector and a linkage member. The fool-proofing set includes a protrusion protruding from or retracting back to the bearing surface and a stopper linking up with the protrusion. The elastic member is disposed in the casing and provides an elastic force so that the protrusion protrudes from the casing normally. The connector is able to operably protrude to a bearing space above the bearing surface or retracts back. When the protrusion protrudes from the bearing surface, the stopper stops at a moving path of the linkage member so that the connector is limited inside the casing. When the protrusion retracts back, the linkage member is not stopped by the stopper so that the connector is able to operably protrude to the bearing space to connect with the electronic device.

9 Claims, 5 Drawing Sheets

DOCKING STATION OF ELECTRONIC DEVICE

CROSS-REFERENCE TO RELATED APPLICATION

This application claims the priority benefit of Taiwan application serial no. 103110874, filed on Mar. 24, 2014. The entirety of the above-mentioned patent application is hereby incorporated by reference herein and made a part of this specification.

BACKGROUND OF THE INVENTION

1. Field of the Invention

The invention relates to a docking station, and particularly relates to a docking station of an electronic device.

2. Description of Related Art

With the development of science and technology, a variety of portable electronic devices, such as notebooks, are available on the market. The portable electronic devices not only make the daily life of people more convenient, but already become indispensable devices to carry with for some users. The developments of notebook and tablet computers all aim at the tendency of being lighter thinner. Some of the functional modules (e.g. the optical disc apparatus) are removed, or the number of input/output port connectors is reduced (e.g. reducing the number of USB connectors from 3 to 2 or 1) to maintain a compact appearance and a preferable weight for the convenience to carry around. In addition, there are corresponding docking station products that offer the user a choice to expand the function of the electronic devices.

When the electronic device is assembled to this kind of docking stations, some of the docking stations require a manual operation to insert a connector that may laterally retract back to or protrude from the casing of the docking station into the corresponding connector at the side surface of the electronic device, so that the docking station is electrically connected with the electronic device. However, if the user places the electronic device on the docking station before retracting back the connector of the docking station, the electronic device may not be appropriately placed on the docking station. It is also possible that the electronic device may press on the connector of the docking station to cause damages.

SUMMARY OF THE INVENTION

The invention provides a docking station of an electronic device having a fool-proofing function to prevent the electronic device from erroneously pressing on the connector.

The docking station of the electronic device of the invention includes a casing, a fool-proofing set, a first elastic member, a connector, and a linkage member. The casing has a bearing surface to bear an electronic device. The fool-proofing set is disposed in the casing below the bearing surface and includes a protrusion and a stopper. The protrusion is movably disposed in the casing and protrudes from or retracts back to the bearing surface, and the stopper is linked to the protrusion. The first elastic member is disposed inside the casing to provide an elastic force to the protrusion, such that one end of the protrusion normally protrudes out of the bearing surface. The connector is movably disposed in the casing and operably protrudes to a bearing space above the bearing surface or retracts back. The linkage member is connected with the connector. When the protrusion protrudes from the bearing surface, the stopper stops on a moving path of the linkage member, such that the connector is unable to operably protrude to the bearing space. When the protrusion retracts back to the bearing surface, the stopper releases stopping on the moving path of the linkage member, such that the connector is able to operably protrude to the bearing space to connect with the electronic device.

Based on the above, in the docking station of the electronic device of the invention, when the protrusion is not pressed down by the electronic device, the stopper stops the linkage member to position-limit the connector inside the casing. When the protrusion is pressed down by the electronic device, the stopper leaves the moving path of the linkage member, so that the linkage member is movable and pushes the connector out of the casing. Therefore, the docking station of the electronic device of the invention may effectively prevent the circumstance that the connector of the docking station protrudes and is damaged when the electronic device is not placed.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
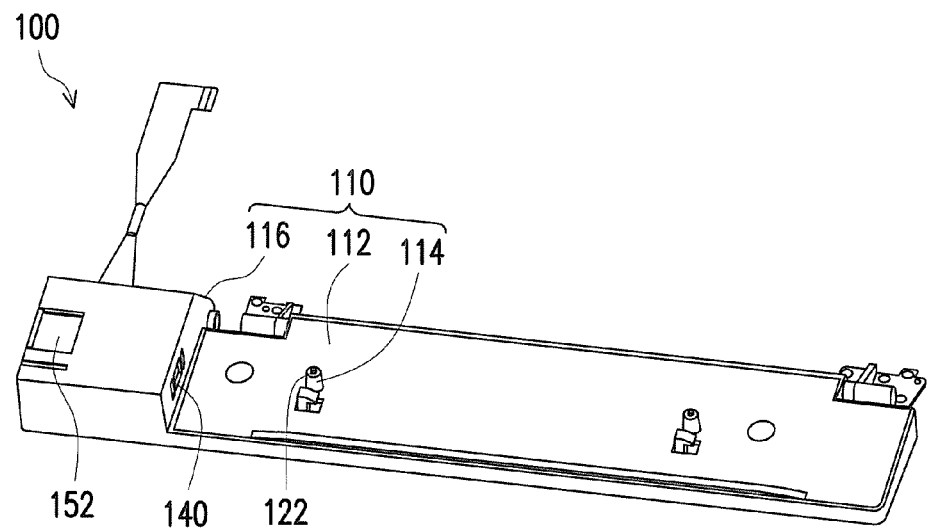
FIG. 1 is a schematic perspective view of a docking station of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
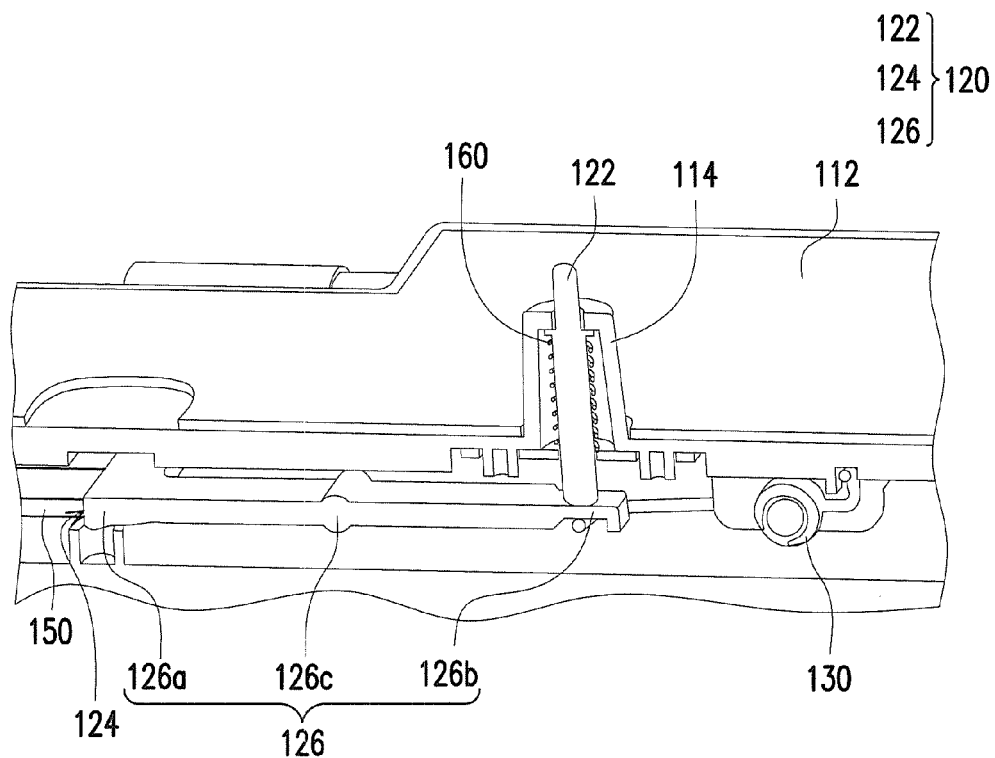
FIG. 2 is a partial cross-sectional schematic view of the docking station of the electronic device shown in FIG. 1.
Figure 3:
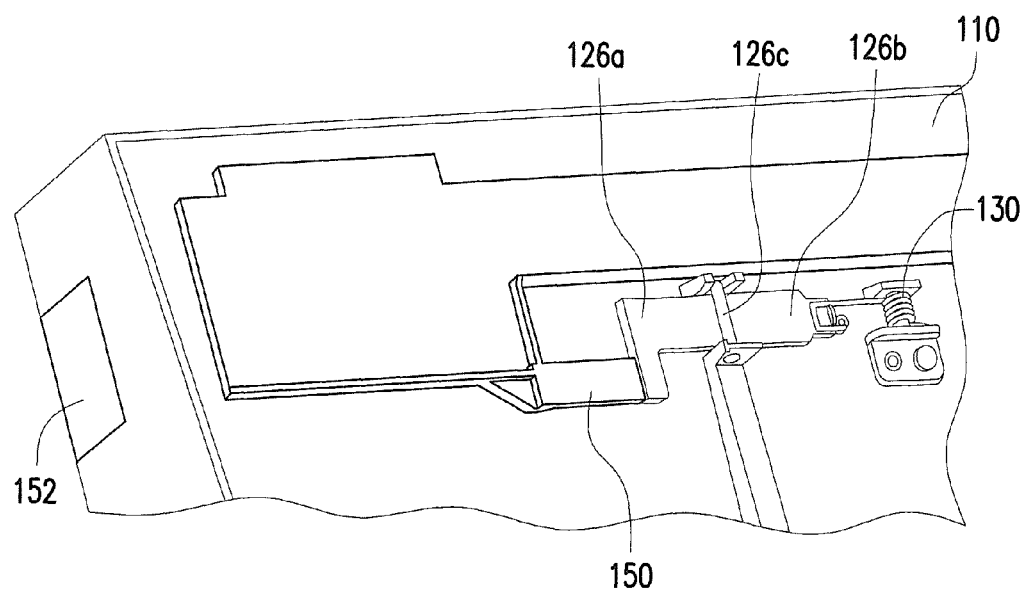
FIG. 3 is a partial bottom schematic view of the docking station of the electronic device shown in FIG. 1 after a bottom part of a casing is removed.

FIG. 1 is a schematic perspective view of a docking station of an electronic device according to an embodiment of the invention. FIG. 2 is a partial cross-sectional schematic view of the docking station of the electronic device shown in FIG. 1. FIG. 3 is a partial bottom schematic view of the docking station of the electronic device shown in FIG. 1 after a bottom part of a casing is removed. A view angle of FIG. 3 is an angle of viewing from bottom to top in FIG. 1. Referring to FIGS. 1-3, in this embodiment, a docking station 100 of an electronic device is a docking device capable of providing power, more connection ports, or other extensive functions for the electronic device (e.g. a laptop or table computer). The docking station 100 of the electronic device of this embodiment includes a casing 110, a fool-proofing set 120, a first elastic member 130, a connector 140, and a linkage member 150.

The casing 110 includes a bearing surface 112, a protrusion part 114 protruding from the bearing surface 112, and an extension area 116 located at one side of a bearing space above the bearing surface 112. When the electronic device is placed on the docking station of the electronic device of this embodiment, the bearing surface 112 may bear the electronic device.

The fool-proofing set 120 is disposed in the casing 110 below the bearing surface 112 and includes a protrusion 122, a stopper 124, and a lever 126. The protrusion 122 may be movably and slidably disposed in the casing 110. More specifically, the protrusion 122 may protrude from or retract back to the protrusion part 114 of the casing 110 along a vertical direction in the figure. The lever 126 has a first end 126a, a second end 126b, and a fulcrum part 126c between the first end 126a and the second end 126b. The fulcrum part 126c is pivoted at the casing 110, the stopper 124 is located at the first end 126a of the lever 126, and the protrusion 122 is configured to contact and press the second end 126b of the lever 126. In other words, when the protrusion 122 moves downward, the protrusion 122 presses down the second end 126b of the lever 126, and the stopper 124 located at the first end 126a of the lever 126 tilts up accordingly. Namely, the stopper 124 is linked to the protrusion 122. Naturally, in other embodiments, the fool-proofing set 120 may not include the lever 126. For example, the fool-proofing set 120 may be configured by directly connecting the stopper 124 to the protrusion 122 or having a structure that the stopper 124 and the protrusion 122 are integrally formed (e.g. forming a T-shaped or L-shaped structure), as long as the stopper 124 is linked to the protrusion 122.

The first elastic member 130 is located inside the casing 110 and is connected between the casing 110 and the fool-proofing set 120. The first elastic member 130 is configured to provide an elastic force, such that one end of the protrusion 122 normally protrudes from the bearing surface 112 of the casing 110. Specifically speaking, the first elastic member 130 is a torsional spring, and two ends of the first elastic member 130 respectively contact the casing 110 and the second end 126b of the lever 126. When the protrusion 122 is not pressed down, an elastic potential of the first elastic member 130 is smaller. When the protrusion 122 is pressed down to make the second end 126b of the lever 126 to move downward accordingly, the first elastic member 130 is deformed and accumulates a greater elastic potential. Thus, when the protrusion 122 being pressed down is released, the elastic force of the first elastic member 130 makes the second end 126b of the lever 126 move upward to upwardly push the protrusion 122. The protrusion 122 thus protrudes from the protrusion part 114 of the casing 110 again.

In addition, in this embodiment, the docking station 100 of the electronic device further includes a second elastic member 160 to provide additional elastic force. Two ends of the second elastic member 160 respectively contact the protrusion 122 and the casing 110, so as to directly provide an upward pushing force to the protrusion 122. Naturally, in other embodiments, the docking station 100 of the electronic device may be configured with the first elastic member 130 only while still achieving a function of restoring the second end 126b of the lever 126 and the protrusion 122 to their original positions.

Figure 4:
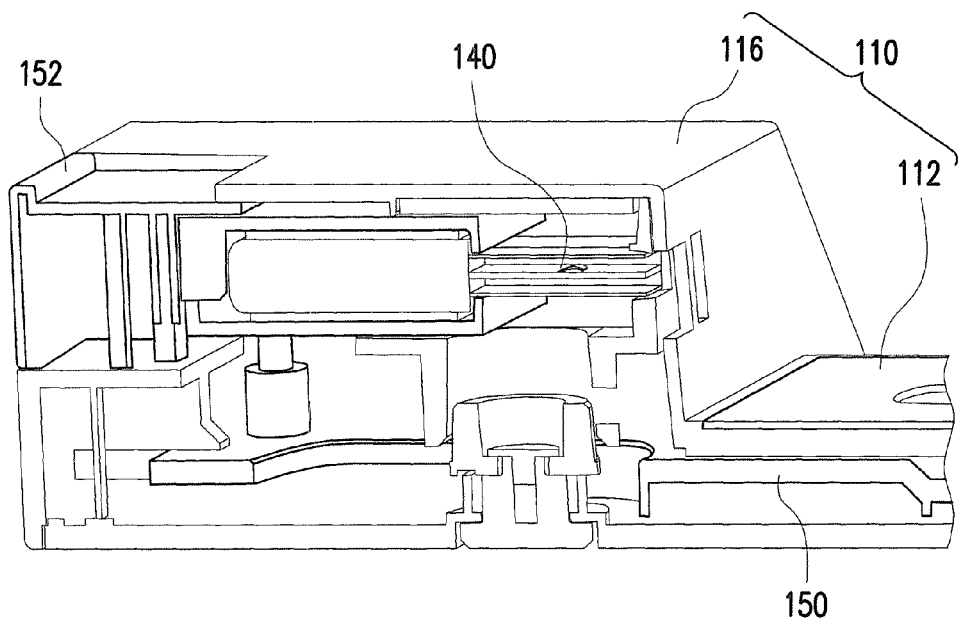
FIG. 4 is another partial cross-sectional schematic side view of the docking station of the electronic device shown in FIG. 1.

FIG. 4 is another partial cross-sectional schematic side view of the docking station of the electronic device shown in FIG. 1. Referring to FIG. 4, the connector 140 is slidably disposed in the casing 110. More specifically, the connector 140 may operably protrude to the bearing space of the bearing surface 112 or retract back to the extension area 116 of the casing 110 along a lateral direction of the figure. In this embodiment, the connector 140 may be a connector such as a USB connector, a thunderbolt connector, or an e-SATA connector, etc. However, a type of the connector 140 is not limited thereto.

In this embodiment, a part of the linkage member 150 is exposed outside the casing 110 as a pushing button 152 for the user to push. Operating the pushing button 152 may drive the connector 140 to protrude to the bearing space or retract back. The linkage member 150 is connected with the connector 140, such that the connector 140 is linked to the linkage member 150. The linkage member 150 may be formed of a plurality of components connected with each other or a single component between the connector 140 and the first end 126a of the lever 126. However, a type of the linkage member 150 is not limited thereto.

As shown in FIGS. 2-4, when the electronic device is not placed on the docking station 100 of the electronic device, the protrusion 122 is not compressed and protrudes from the bearing surface 112 of the casing 110, so the stopper 124 is located on a moving path of the linkage member 150. The linkage member 150 is limited from moving by the stopper 124, and the connector 140 is consequently not able to operably protrude from the casing 110. In other words, under such circumstance, even if the user applies a force to the pushing button 152 of the linkage member 150 exposed outside the casing 110, a right end of the linkage member 150 in the figure is still limited by the stopper 124 and not movable. Thus, the electronic device may be appropriately placed on the bearing surface 112 without limitation, and a circumstance that the electronic device presses on the protruding connector 140 is prevented.

Figure 5:
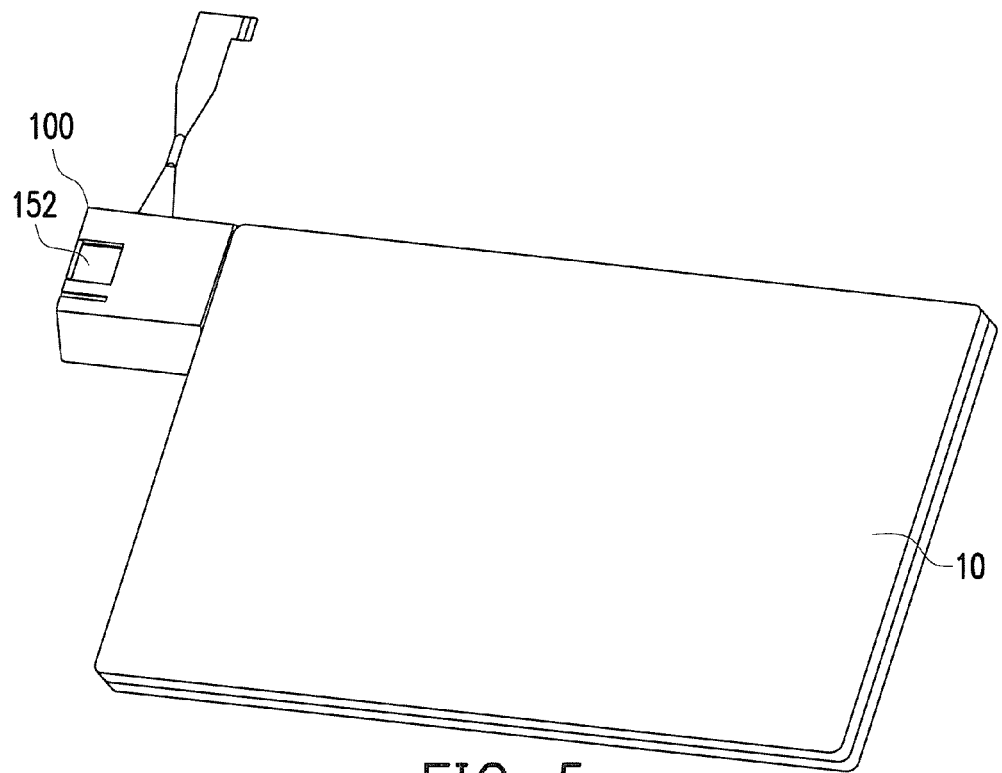
FIG. 5 is a schematic view illustrating that the electronic device is placed on the docking station of the electronic device shown in FIG. 1.
Figure 6:
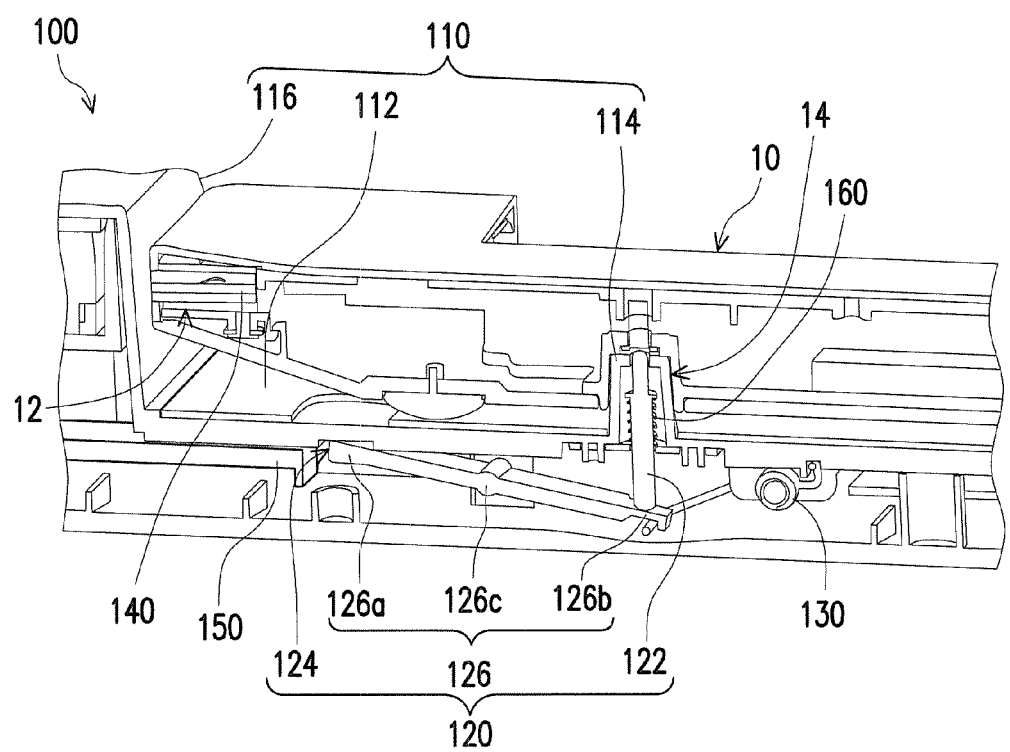
FIG. 6 is a partial cross-sectional schematic side view of FIG. 5.
Figure 7:
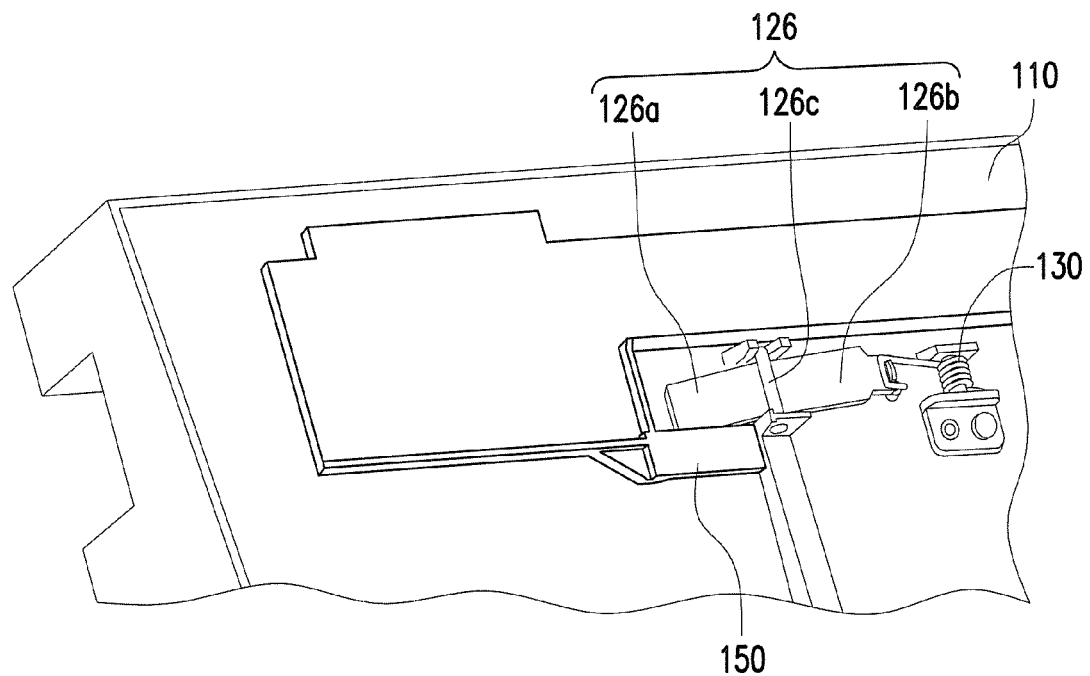
FIG. 7 is a partial schematic bottom view of FIG. 5 after the bottom part of the casing and the electronic device are removed.
Figure 8:
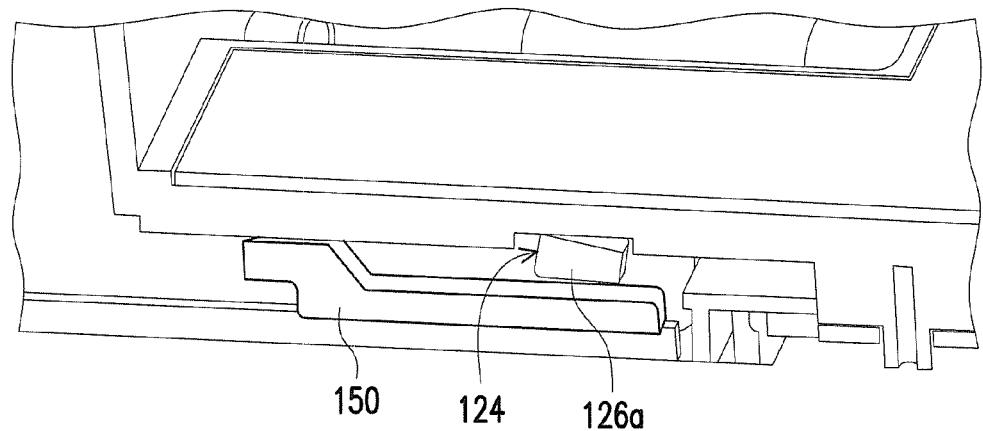
FIG. 8 is another partial cross-sectional schematic side view of FIG. 5.

FIG. 5 is a schematic view illustrating that the electronic device is placed on the docking station of the electronic device shown in FIG. 1. FIG. 6 is a partial cross-sectional schematic side view of FIG. 5. FIG. 7 is a partial schematic bottom view of FIG. 5 after the bottom part of the casing and the electronic device are removed. FIG. 8 is another partial cross-sectional schematic side view of FIG. 5. A view angle of FIG. 7 is an angle of viewing from bottom to top in FIG. 5. Referring to FIGS. 5-8, when an electronic device 10 is placed on the bearing surface 112 of the docking station 100 of the electronic device, the electronic device 10 presses down the protrusion 122, such that the protrusion 122 retracts back to the protrusion part 114 of the casing 110. The protrusion 122 that is pressed down then presses and contacts the second end 126b of the lever 126, such that the first end 126a of the lever 126 tilts up and moves away from the moving path of the linkage member 150. In other words, the stopper 124 releases stopping the linkage member 150 under such circumstance.

Figure 9:
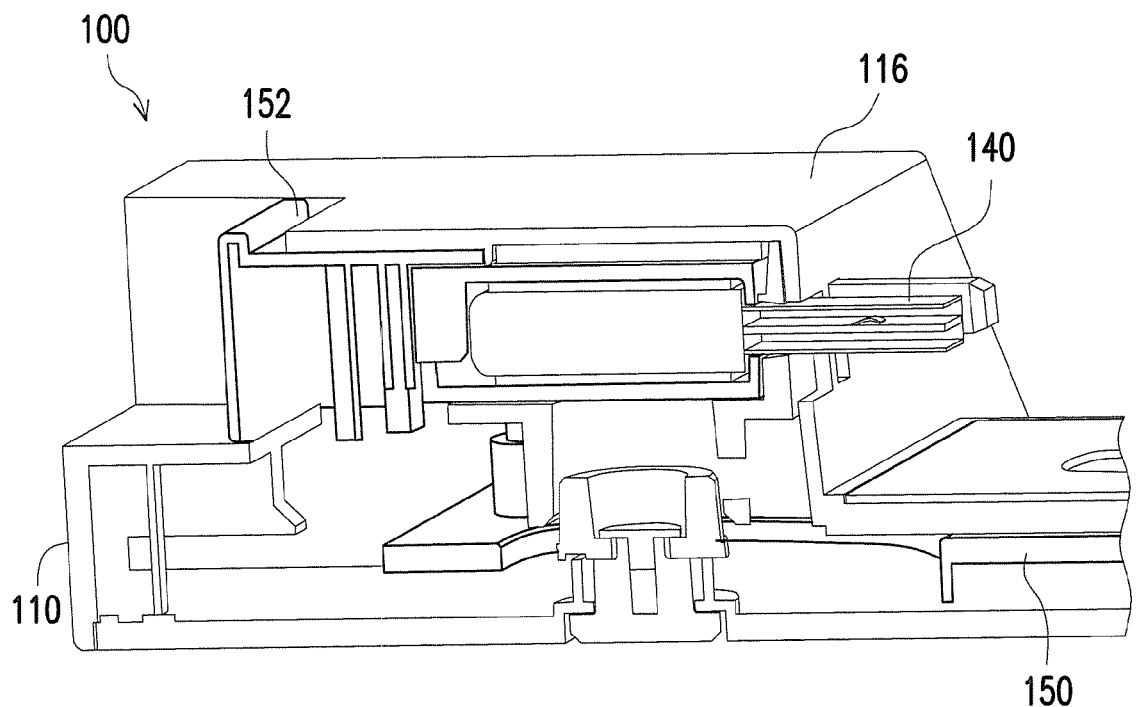
FIG. 9 is a partial cross-sectional schematic side view illustrating that a connector of the docking station of the electronic device shown in FIG. 1 is pushed out.
Figure 10:
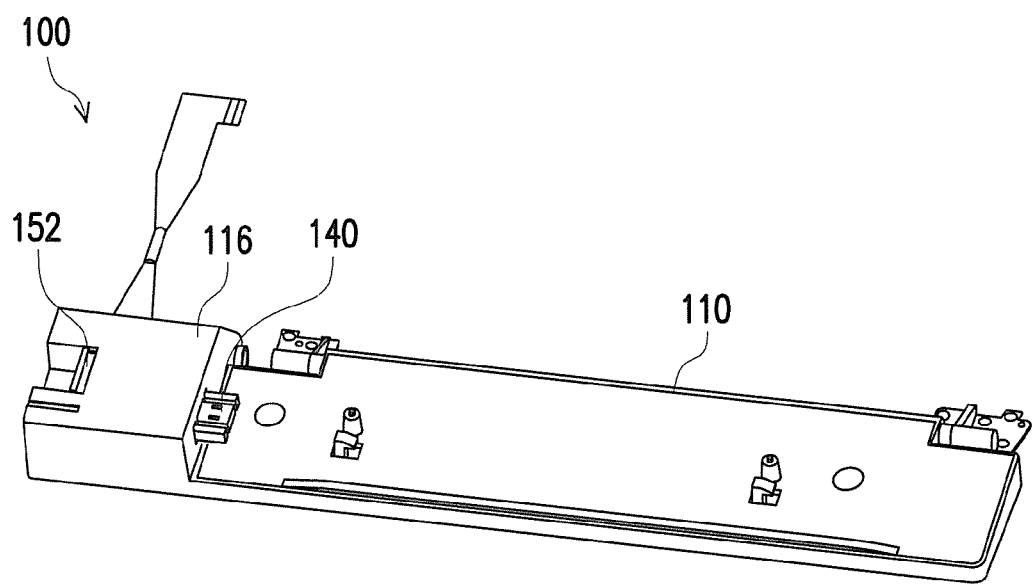
FIG. 10 is a schematic perspective view illustrating that the connector of the docking station of the electronic device shown in FIG. 1 is pushed out.

FIG. 9 is a partial cross-sectional schematic side view illustrating that a connector of the docking station of the electronic device shown in FIG. 1 is pushed out. FIG. 10 is a schematic perspective view illustrating that the connector of the docking station of the electronic device shown in FIG. 1 is pushed out. To clearly show that a circumstance when the connector 140 is pushed out, the electronic device 10 above the docking station 100 of the electronic device is removed from FIGS. 9 and 10. Referring to FIGS. 5, 9, and 10 simultaneously, when the user applies a force to the pushing button 152 of the linkage member 150 exposed outside the casing 110, the linkage member 150 and the connector 140 move together toward the right of the figure, such that the connector 140 protrudes rightwardly from the extension area 116 of the casing 110.

Back to FIG. 6, the electronic device 10 has a corresponding connector 12 capable of butting the connector 140 for the connector 140 to be inserted in for an electrical connection at a position corresponding to the connector 140 of the docking station 100 of the electronic device.

In this embodiment, the protrusion 122 is disposed inside the protrusion part 114. Namely, the protrusion part 114 is a hollow tubular structure and accommodates the protrusion 122 and the second elastic member 160 to allow the protrusion 122 and the second elastic member 160 to move vertically therein. The protrusion part 114 may be configured to correspond to a positioning hole 14 configured in advance at a bottom part of the electronic device 10, so as to be appropriately inserted into the positioning hole 14 and ensure that the electronic device 10 is placed on the bearing surface at a correct position. In other words, in some conventional docking stations and electronic devices known by the public, a design with similar protrusion part and position hole to ensure correct positioning of the electronic devices is disclosed. However, in the present application, the fool-proofing set 120 is delicately disposed inside the casing 110 at the location of the protrusion part 114, and the protrusion part 114 is designed to form a hollow structure to accommodate the protrusion 122 and the second elastic member 160 therein. Thus, an appearance of the bearing surface 112 is maintained to be original and flat. However, in other embodiments, the docking station 100 may not be disposed with the protrusion part 114 and the electronic device 10 may not be disposed with the positioning hole. The protrusion 122 may directly protrude and be exposed from the bearing surface 112. Still, the same purpose and efficacy described in the invention may also be achieved.

In view of the foregoing, the docking station of the electronic device of the invention movably disposes the stopper linked to the protrusion on the moving path of the linkage member lined to the connector. When the protrusion is not pressed down by the electronic device and protrudes from the casing, the stopper stops the linkage member, such that the connector is position-limited inside the casing. When the protrusion is pressed down by the electronic device and retracts back to the casing, the stopper leaves the moving path of the linkage member, while the linkage member is movable and pushes the connector out of the casing. Thus, the docking station of the electronic device of the invention may effectively ensure that the electronic device is not interfered when being placed on the docking station, and further prevent the circumstance that the connector of the docking station protrudes when the electronic device is not placed, making one or both of the docking station and the electronic device damaged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A docking station of an electronic device, comprising:
   a casing, having a bearing surface to bear an electronic device;
   a fool-proofing set, disposed in the casing below the bearing surface and comprising a protrusion, a lever and a stopper, wherein the protrusion is movably disposed in the casing and protrudes from or retracts back to the bearing surface, and the stopper is linked to the protrusion;
   a first elastic member, disposed inside the casing to provide an elastic force to the protrusion, such that one end of the protrusion normally protrudes out of the bearing surface;
   a connector, movably disposed in the casing and operably protruding to a bearing space above the bearing surface or retracting back; and
   a linkage member, connected with the connector,
   wherein when the protrusion protrudes from the bearing surface, the stopper stops on a moving path of the linkage member, such that the connector is unable to operably protrude to the bearing space, and
   when the protrusion retracts back to the bearing surface, the stopper releases stopping on the moving path of the linkage member, such that the connector is able to operably protrude to the bearing space to connect with the electronic device,
   wherein the lever having a first end, a second end, and a fulcrum part between the first end and the second end, the fulcrum part is pivoted at the casing, the stopper is located at the first end of the lever, and the protrusion contacts and presses the second end of the lever when retracting back to the bearing surface, such that the stopper at the first end moves and releases stopping on the moving path of the linkage member.

2. The docking station of the electronic device as claimed in claim 1, wherein the first elastic member is a torsional spring, and two ends of the first elastic member respectively contact the casing and the second end of the lever.

3. The docking station of the electronic device as claimed in claim 1, further comprising:
   a second elastic member, wherein two ends of the second elastic member respectively contact the protrusion and the casing.

4. The docking station of the electronic device as claimed in claim 1, wherein a portion of the linkage member is exposed outside the casing to form a pushing button, and operating the pushing button drives the connector to protrude from or retract back to the bearing space.

5. The docking station of the electronic device as claimed in claim 1, wherein a moving direction of the protrusion is vertical to a moving direction of the connector.

6. The docking station of the electronic device as claimed in claim 5, wherein the protrusion moves in a direction vertical to the bearing surface, and the connector moves in a direction parallel to the bearing surface.

7. The docking station of the electronic device as claimed in claim 1, wherein a protrusion part is disposed on the bearing surface, and the protrusion protrudes from or retracts back into a hollow space of the protrusion part.

8. The docking station of the electronic device as claimed in claim 7, wherein the protrusion part corresponds to a positioning hole of the electronic device, and the electronic device is accurately placed on the bearing surface by inserting the protrusion part into the positioning hole.

9. The docking station of the electronic device as claimed in claim 1, wherein the casing further comprises an extension area disposed at one side of the bearing surface and protrudes from the bearing surface, and the connector is disposed in the extension area.

* * * * *